United States Patent [19]
Wilson

[11] 3,763,039
[45] Oct. 2, 1973

[54] METHOD OF TREATING SEWAGE USING HIGH POLYMER RATIO FLOCCULATION AGENT BIOLOGICALLY PRODUCED IN SITU

[75] Inventor: George E. Wilson, Sterling, Ill.

[73] Assignee: Houdaille Industries, Inc., Buffalo, N.Y.

[22] Filed: Apr. 10, 1972

[21] Appl. No.: 242,344

[52] U.S. Cl............ 210/6, 195/31, 210/11, 210/18, 210/54
[51] Int. Cl............ C02b 1/20, C02c 1/06
[58] Field of Search ............ 210/3–9, 210/11, 18, 54; 195/31 P

[56] References Cited
UNITED STATES PATENTS
3,397,139   8/1968   Sak ............ 210/7

OTHER PUBLICATIONS
Pavoni, J. L., Bacterial Exocellular Polymers and Biological Flocculation, Journal WPCF, Vol. 44, Mar. 1972, pp. 414–431 (P.O.S.L.).

Primary Examiner—Michael Rogers
Attorney—Benjamin H. Sherman et al.

[57] ABSTRACT

A process for treating sewage in which a high polymer ratio flocculation agent biologically produced in situ is used to flocculate the colloidal suspended solids upstream of the primary clarifier. The flocculation agent is produced by subjecting microorganisms capable of generating polymeric material to a high food content environment in an aeration tank into which supernatant from the primary clarifier is delivered and then subjecting the microorganisms to a low food content environment, as a consequence of which polymeric material is generated through the extracellular activity of the microorganisms.

7 Claims, 9 Drawing Figures

Fig. 1
CONVENTIONAL
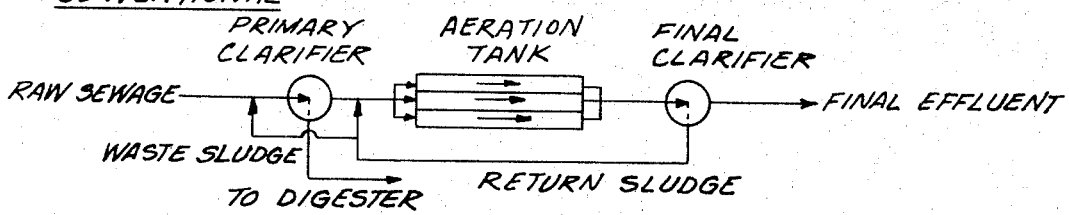
INTERMEDIATE EXTENDED AERATION WITH TERTIARY FILTRATION
CONTACT STABILIZATION
STEP AERATION
COMPLETE MIX

Fig. 6

AERATION TANK CAPACITIES AND PERMISSIBLE LOADINGS

| PROCESS TYPE | PERMISSIBLE LOADING FACTORS | | | NORMAL HYDRAULIC LOADS | REQUIRED AERATION VOLUMES |
|---|---|---|---|---|---|
| | F/M LOADING LBS BOD/ LB MLSS-DAY | ACTIVE LOADING LBS BOD/ LB ACTIVE MAT'L-DAY | VOLUMETRIC LBS BOD/ 1,000 FT$^3$-DAY | LBS BOD/ M.G.D.-DAY | 1,000 FT$^3$/ M.G.D. |
| CONVENTIONAL | .25 – .50 | 2.5 – 5.0 | 40 | 1500 | 38 |
| INTERMEDIATE EXTENDED AERATION WITH TERTIARY FILTRATION | .10 – .20 | 1.0 – 2.0 | 35 | 2150 | 62 |
| CONTACT STABILIZATION | .20 – .50 | 2.0 – 5.0 | 50 | 1500 | 30 |
| STEP AERATION | .20 – .50 | 2.0 – 5.0 | 50 | 1500 | 30 |
| COMPLETE MIX | .50 | 5.0 | 35 | 1500 | 43 |
| PRESENT INVENTION | — | 5.0 | 400 | 650 | 2 |

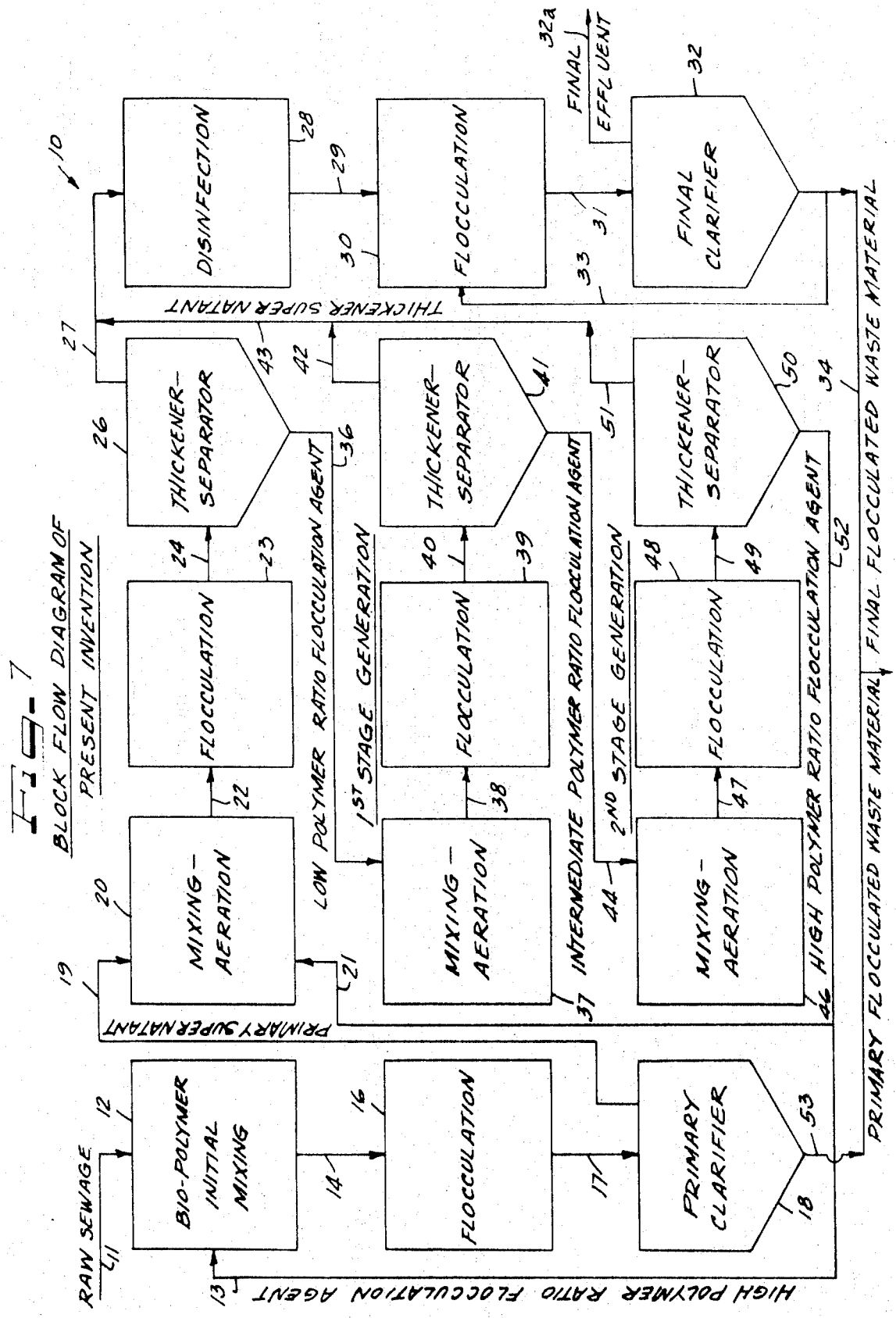
Fig. 7 BLOCK FLOW DIAGRAM OF PRESENT INVENTION

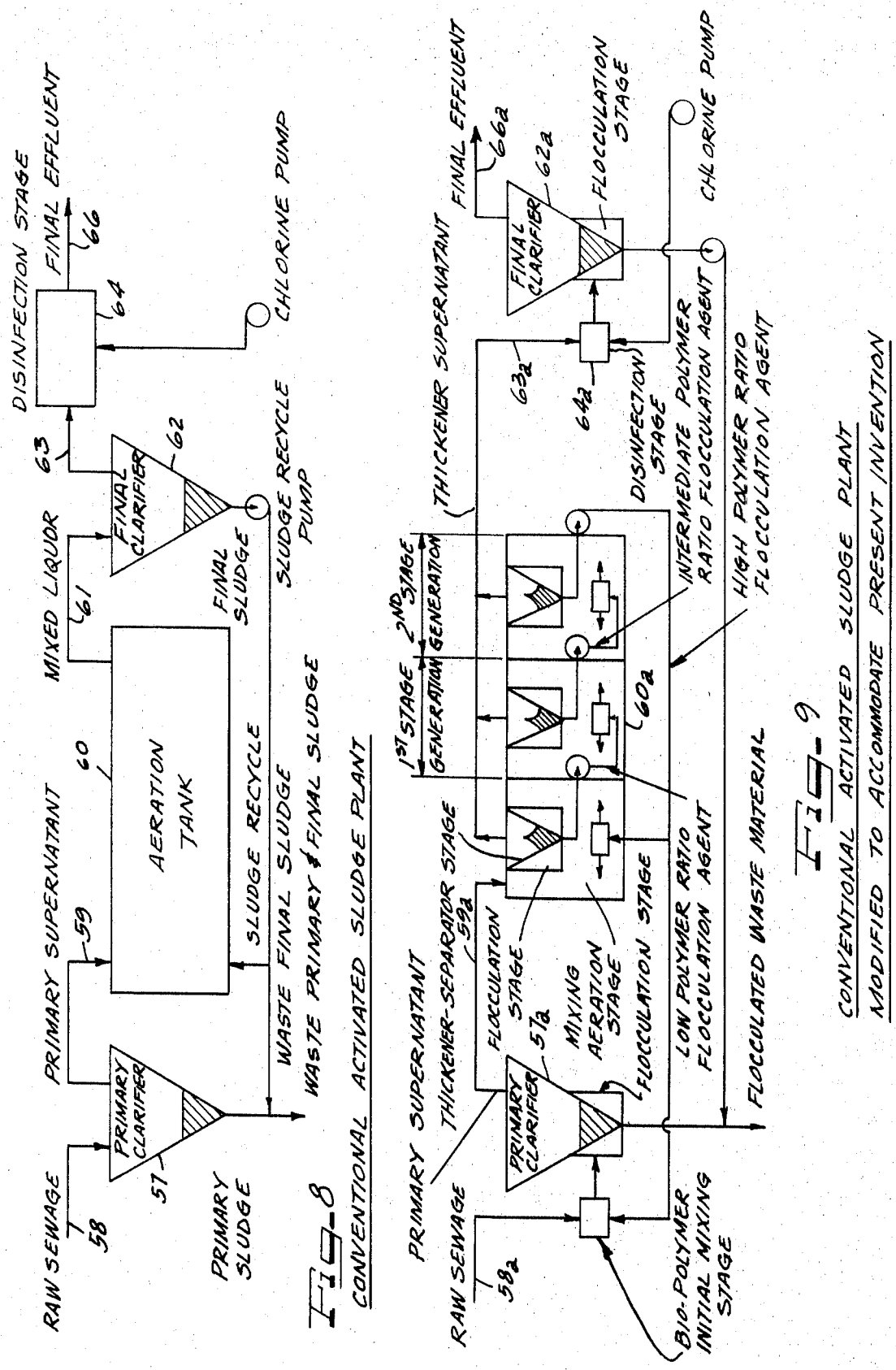

METHOD OF TREATING SEWAGE USING HIGH POLYMER RATIO FLOCCULATION AGENT BIOLOGICALLY PRODUCED IN SITU

BACKGROUND OF THE INVENTION

This invention relates generally to the treatment of waste material and more particularly to the field of sewage treatment.

It is well known that problems in disposing of or treating waste material have become more pronounced as population has increased. As a consequence of insufficient and inadequate methods of disposing of and treating waste material the environment itself and the life sustaining elements thereof have suffered.

Of all the problems which exist in the field of waste treatment perhaps none is greater than that involving the treatment of sewage. As population increases the lack of adequate sewage treatment capability results in pollution of our waterways in excess of the level which they can satisfactorily assimilate.

As a result of the ecological impairment inherent in inadequate sewage treatment society at large and legislative bodies have addressed themselves to the necessity for establishing satisfactory effluent standards. In and of itself, of course, the establishment of such standards is easily achieved. Furthermore, the present state of sewage treatment technology is capable of meeting such standards.

The greater problem, of course, resides in financing the facilities required in order to attain such effluent standards. For example, currently the cost involved in providing the most rudimentary of sewage treatment processes, primary treatment, involving only separation of gravity settleable solids from the sewage, is approximately $50 per capita. Secondary treatment, minimally required to attain most existing effluent standards, involves an expenditure of approximately $100 per capita.

The above figures represent first costs. Operating costs generally approximate the amortized first costs. As a consequence of these costs most municipalities find that it is difficult or impossible to implement the programs necessary to attain satisfactory effluent standards, even though the desirability of such standards is well recognized.

The first cost figures shown hereinabove represent costs involved in the construction of additional sewage treatment facilities of the types presently in use, or the enlargement of existing facilities. In order to avoid the first costs involved in the construction of new facilities or the enlargement of existing facilities, efforts have been made to increase the treatment efficiency of existing facilities without incurring substantial additional first or capital costs.

An example of such known efforts involves the addition of chemicals to the sewage at various points in the treatment process which tends to reduce the treatment required of or from the process per se. While this has the effect of increasing the overall system efficiency, it also involves additional operating costs. First of all, the chemicals themselves must be purchased on a continuing basis. Secondly, the disposal of the end products which result from the use of chemical additives involves an additional expense.

It should be recognized that the vast majority of secondary sewage treatment plants presently in use are of the type known as activated sludge systems. Generally, such systems include a primary clarifier tank into which the raw sewage is introduced and in which the gravity settleable solids are separated from the sewage.

The supernatant is withdrawn from the primary clarifier and mixed with an activated sludge and introduced into an aeration basin, into which air or another oxygen-containing gas is supplied. A substantial portion of the bio-degradeable organic material in the supernatant is converted to carbon dioxide, water and additional activated sludge. In addition, colloidal suspended solids in the supernatant are entrapped in the activated sludge matrix.

The resultant mixed liquor is withdrawn from the aeration basin to a final clarifier, wherein the gravity settleable activated sludge material is separated from the treated waste water.

A portion of the separated activated sludge is returned and mixed with the supernatant from the primary clarifier, while the remainder is disposed of with the primary sludge that is withdrawn from the primary clarifier.

The purpose of the chemical additives mentioned hereinabove is to enhance the degree and rate of separation of the gravity settleable solids in the clarifiers. Among the chemicals which have been used are organic polyelectrolytes and inorganic hydrolyzing metal coagulants. As will be shown hereinafter, attempts have also been made to utilize waste activated sludge as flocculation agent to enhance the degree of separation of colloidal suspended solids in the primary clarifier.

None of the foregoing methods of increasing the efficiency of existing sewage treatment systems has been wholly satisfactory. As previously noted, chemical additives introduce additional expenses, and the recycling of activated sludge does not produce any significant increase in overall system efficiency.

In accordance with the present invention an existing activated sludge plant can be converted to a plant having an increased capacity substantially equal to that which would have been achieved by the addition of chemicals to the activated sludge plant without, however, incurring any of the additional operative costs and disposal problems associated with chemical additives.

By virtue of the present invention the capacity of a sewage treatment plant which presently utilizes any one of the several conventional activated sludge processes can be substantially increased at a cost which is substantially less than that which would be required to enlarge the facility to provide the same increase in capacity. The present invention will therefore enable many municipalities, which could not otherwise do so because of the prohibitive costs involved, to increase the capacity of their existing sewage treatments systems and thereby attain the effluent standards which are recognized as being essential to the maintenance of a satisfactory ecology.

SUMMARY OF THE INVENTION

The present invention involves the introduction of a high polymer ratio flocculation agent into raw sewage for the purpose of enhancing the removal of colloidal suspended solids in the primary clarifier of a sewage treatment plant. The flocculation agent comprises at least 10 percent by dry weight biologically derived polymeric material and can be derived in situ from microorganisms that are commonly found in an activated sludge process. This flocculation agent removes colloidal suspended solids in a primary clarification stage to a degree and at a rate comparable to that achieved through the use of currently available chemical additives. The expenses involved in the purchase and disposal of such additives are eliminated, however.

The present invention can be utilized to substantially increase the capacity of an existing sewage treatment plant which uses an activated sludge process while involving only a fraction of the first cost expense which would otherwise be required in order to increase the plant capacity to the same degree merely by increasing the size of the activated sludge process commensurately. This is accomplished without a significant increase in operating costs.

Furthermore the principles of the present invention can be advantageously utilized to reduce first costs as well as operating costs of new sewage treatment plants capable of producing effluent meeting current secondary treatment standards.

Sewage treatment plants employing the principles of the present invention may utilize substantially the same physical plant as those utilized in any of known activated sludge processes. Consequently an existing activated sludge plant can easily accommodate the improved system of the present invention. It is envisioned that essentially every municipal sewage treatment plant utilizing an activated sludge process can be converted to conform to the present invention, thereby substantially increasing plant capacity without any substantial first cost obligations and without any increase in operating costs.

It is therefore, an object of the present invention to substantially increase the capacity of existing sewage treatment plants which produce effluents which meet secondary treatment standards without incurring the first cost normally associated with such capacity increase.

Another object of the invention is to substantially reduce on a per capita basis, the operating costs of such sewage treatment plants.

Another object of the invention is to reduce the costs involved in constructing new sewage treatment plants which produce effluents capable of meeting secondary treatment standards.

Another object of the present invention is to produce, within a sewage treatment system, biologically derived polymeric material for use as a flocculation agent in removing colloidal suspended solids in a primary clarification stage, thereby reducing the biochemical oxygen demand (BOD) at the initial clarification stage to approximately the same level as would be derived from the use of chemical additives.

Another object of the invention is to subject microorganisms commonly found in activated sludge to conditions under which those microorganisms which produce flocculent polymeric material are separated from the non-polymer generating microorganisms and the production of polymeric material is enhanced.

Another object of the present invention is to produce from a portion of the soluble BOD in raw sewage through the instrumentality of microorganisms capable of growing in said soluble BOD, a high polymer flocculation agent comprising a relatively high percentage by dry weight of biologically derived polymeric material.

Another object of the present invention is to produce a polymeric material comprising a group of polymers consisting of monomers selected from the group consisting of glucose, rhamnose, galactose, xylose, mannose, maltose, lactose, glucosamine, glactosamine, $\beta$-hydroxy and butyric acid and mixtures thereof.

Another object of the present invention is to enhance the production of polymeric material from microorganisms capable of producing such material by alternately subjecting the microorganisms to a high and low food content environments.

Another object of the present invention is to provide a physical selection process for separating microorganisms capable of generating polymeric material together with that polymeric material, from microorganisms which are incapable of generating such material.

Many other features, advantages and additional objects of the present invention will become manifest to those versed in the art upon making reference to the detailed description which follows and the accompanying drawing, in which exemplary embodiments of the invention are indicated diagrammatically for illustrative purposes.

BRIEF DESCRIPTION OF THE DRAWING

FIGS. 1–5 are schematic illustrations of the various activated sludge processes presently being employed in the treatment of waste sewage.

FIG. 6 is a chart which indicates the design parameters relating to the activated sludge processes shown in FIGS. 1–5 as well as the improved process of the present invention.

FIG. 7 is a block-flow diagram of an improved sewage treatment system constructed in accordance with the principles of the present invention.

FIG. 8 is a schematic flow diagram of the conventional activated sludge process indicated in FIG. 1.

FIG. 9 is a schematic diagram which illustrates the sewage treatment plant shown in FIG. 8 modified to accommodate the present invention.

DESCRIPTION OF THE PREFERRED EMBODIMENTS

FIGS. 1–5 illustrate diagrammatically various processes or systems which are currently being utilized in treating raw sewage. In FIG. 1 the raw sewage is introduced directly into a primary clarifier in which the gravity settleable solids are separated from the waste water. This, of course, removes a portion of the BOD (biochemical oxygen demand). The supernatant is withdrawn from the primary clarifier and discharged into an aeration tank in which additional BOD is removed along with colloidal suspended solids.

The additional BOD and colloidal suspended solids are removed in the aeration tank by the action of what is commonly referred to as activated sludge. Activated sludge is a mixture of inert organic material, microorganisms and flocculent material. In the aeration tank this mixture is generally referred to as Mixed Liquor Suspended Solids (MLSS) and is measured on a dry weight basis.

The mixture of waste water and MLSS is withdrawn from the aeration tank and delivered to a final clarifier tank in which gravity settleable activated sludge is separated from the aerated waste water. Thereafter, the supernatant is withdrawn from the final clarifier as final effluent. The separated activated sludge is recycled, a portion being returned to the aeration tank and the remainder being introduced into the raw sewage ahead or upstream of the primary clarifier.

The gravity settleable solids which are separated from the waste water in the primary clarifier are withdrawn and disposed of in any suitable manner.

Figure 2:
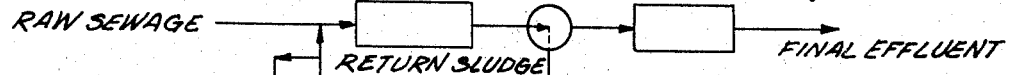

Another commonly utilized sewage treatment system is shown in FIG. 2 in which the raw sewage is delivered directly to an aeration tank where it is acted upon by activated sludge for removal of BOD and colloidal suspended solids. None of the gravity settleable solids are separated from the waste water either ahead of or in the aeration tank and instead the entire mixed liquor is delivered to a final clarification tank in which the gravity settleable MLSS is separated from the aerated waste water. The supernatant is delivered from the final clarifier to tertiary filters for final polishing and the discharge from the tertiary filters is the final effluent. Once again, the activated sludge which is separated in the final clarification stage is recycled and intro-duced into the aeration tank on the upstream side thereof.

Figure 3:
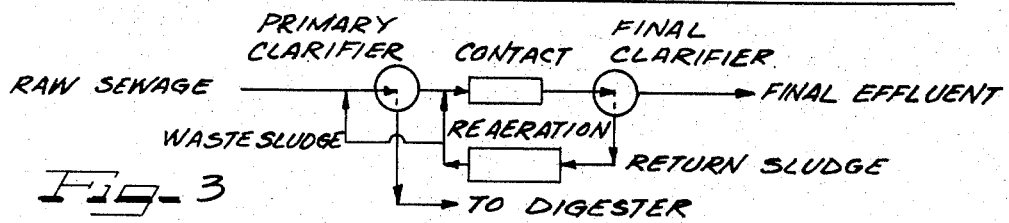

In the process disclosed in FIG. 3 the raw sewage is introduced directly into a primary clarifier, the supernatant from which is delivered to a contact zone in which the BOD and the colloidal suspended solids are removed from the waste water. The mixed liquor is then transported to a final clarifier for gravitational settling-out of the activated sludge and the supernatant is withdrawn in the form of final effluent.

The settled activated sludge is withdrawn from the final clarifier and introduced into a reaeration zone. In this latter zone the activated sludge is subjected to additional aeration for the purpose of removing residual BOD and improving the settling characteristics of the activated sludge. From the reaeration zone the activated sludge is delivered to the upstream side of the primary clarifier to mix with the incoming raw sewage. Waste sludge is withdrawn from the primary clarifier to be disposed of as desired.

Figure 4:
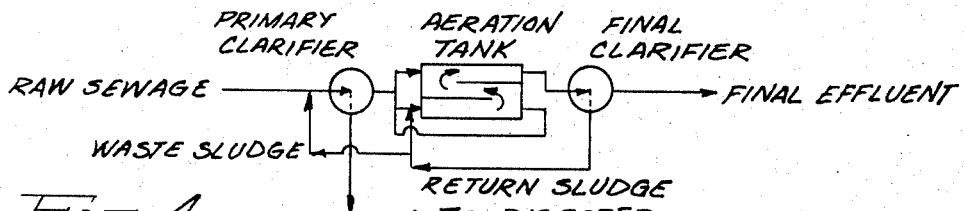
Figure 5:
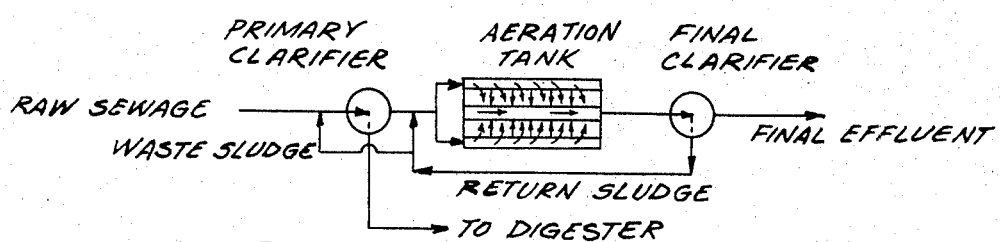

The process disclosed in FIG. 4 is similar to that shown in FIG. 1 except that the supernatant withdrawn from the primary clarifier is introduced into the aeration tank at multiple points to provide a more uniform loading of the aeration tank. The process shown in FIG. 5 is also quite similar to that shown in FIG. 4 except that the supernatant from the primary clarifier, rather than being introduced into the aeration tank at several distinct points, is introduced substantially uniformly along the entire length of the aeration tank.

As noted, all of the known sewage treatment systems shown in FIGS. 1–5 utilize activated sludge for the purpose of treating and purifying the sewage. It may be appropriate at the outset to discuss activated sludge and the role which it performs in purifying sewage.

Generally, domestic raw sewage includes water which con-tains several types of solids. Some of the solids are dissolved in the water and cannot be removed by gravitational separation. Other solids are referred to as colloidal suspended solids. These cannot easily be removed by gravitational separation. Yet, other solids are referred to as settleable solids and these can be removed easily by gravitational separation.

The solids contained in raw sewage include material which is bio-degradable, which means that it can be converted biochemically to carbon dioxide, water and cellular protoplasm. The oxygen equivalent of the bio-degradeable material is expressed as the Bio-chemical Oxygen Demand (BOD) of such bio-degradeable material. One important function of an activated sludge sewage treatment system is to remove, to the greatest extent feasible, the BOD from the sewage, as will be understood by those skilled in the art.

In most activated sludge processes the raw sewage is first delivered to a clarifier tank to enable the settleable solids to separate from the remaining portion of the sewage. These settled-out solids (primary sludge) are then merely withdrawn from the clarifier for subsequent disposal. Approximately 40 percent of the suspended solids and approximately 30 percent of the BOD are removed from the sewage in the primary clarifier.

The supernatant which is withdrawn from the primary clarifier still contains a relatively high percentage of the colloidal suspended solids together with essentially all of the dissolved solids.

Thus, approximately 70 percent of the total BOD of the raw sewage is contained in the supernatant which is withdrawn from the primary clarifier and discharged into the aeration tank. The purpose of the activated sludge in the aeration tank is to (a) entrap the colloidal suspended solids to enable them to be gravitationally separated, and to (b) assimilate the soluble solids which are bio-degradeable for the purpose of converting the same to carbon dioxide, water and cellular protoplasm. Approximately 50% of the suspended solids and 50 percent of the BOD contained in the original raw sewage are removed from the waste water by virtue of the action of the activated sludge and subsequent gravitational separation of the activated sludge in the final clarifier.

The supernatant which is subsequently removed from the final clarifier is generally referred to as the final effluent. The activated sludge which is separated gravitationally is withdrawn from the final clarifier and a portion thereof is recycled into the aeration tank to again perform a purification function. The remainder may be disposed of in any suitable manner.

In some known processes, as indicated for example in FIGS. 1–5, the waste activated sludge may be introduced into the stream of raw sewage upstream of the primary clarifier to settle out with the gravity settleable solids. The view has been held from time to time that this recirculation of waste activated sludge and removal thereof with the gravity settled solids enhances the dewaterability of the admixture for ease in subsequent disposal.

Activated sludge per se is a rather well defined term in the art of sewage treatment and is generally considered to consist of approximately 90 percent inert organic debris, the remainder including active biological material. It is well known that this active biological material includes a variety of microorganisms. The kind of microorganisms in any activated sludge process and the quantity thereof probably varies almost continuously in response to variations in a multitude of conditions which affect the microorganisms and their various interactions. These conditions include the composition and concentration of the materials in the raw sewage, ambient temperature, hydraulic detention time, sludge settling characteristics, concentration of dissolved oxygen, sludge floc size, periods of anaerobiosis and the like.

It would be difficult to predict with respect to any given activated sludge process at any given point in time those microorganisms which may be present in activated sludge and the degree of dominance of any given specie. Suffice it to say, however, that in a properly designed activated sludge system which is being operated within its design capacity, the make-up of the mircroorganisms is sufficient to provide the BOD removal and flocculent condition necessary to purify the sewage to a satisfactory level.

It is known, however, that from among the many microorganisms which may exist from time to time in activated sludge are members of the bacterial species Zoogloea, Escherichia, Psuedomonas and Comamonas, as well as many other varieties and species of microorganisms.

As noted, however, the critical characteristics common to the totality of microorganisms which exist in any activated sludge process are (a) the ability to assimilate BOD and (b) the ability to flocculate for the purpose of removing the colloidal suspended solids in the final clarification stage.

It has long been known that there are several significant factors involved in designing and operating an activated sludge system in a manner which produces a final effluent having an acceptable level of purification, i.e., capable of meeting current secondary treatment standards.

Essentially these factors, which are generally referred to as loading factors, relate to the rate at which the BOD is supplied to the activated sludge contained in the aeration tank. If these factors are not maintained within relatively narrow ranges the activated sludge loses either or both of the critical characteristics mentioned hereinabove.

The first of these factors is known as Mixed Liquor Suspended Solids (MLSS) loading factor or "food to microorganism ratio." This factor is generally indicated symbolically as "F/M Loading". The factor is expressed in pounds of BOD loaded per day per pound of MLSS in the aeration tank.

The second of these loading factors, which in some respects is closely related to the first but for some purposes is a more meaningful and useful factor, is the "Active Loading" factor. This factor is expressed as pounds of BOD loaded per day per pound of "Active Material" in the aeration tank.

As used herein "Active Material" comprises essentially that portion of activated sludge devoid of inert organic material and debris that may exist in the activated sludge. Thus "Active Material" may be used synonomously with "active biological material" as that term is used hereinabove and, as previously noted, generally constitutes approximately 10 percent (on a dry weight basis) of the total MLSS which exists in any activated sludge system which is treating primarily domestic sewage.

The third of these loading factors which is significant in the design and operation of an activated sludge waste treatment system is known as "Volumetric Loading". This factor may be expressed as pounds of BOD loaded per day in an aeration tank per 1000 ft.³ of aeration tank volume.

It is generally recognized that these three loading factors may vary within permissible ranges and still provide satisfactory secondary treatment.

In most activated sludge systems the first factor (F/M Loading) should be maintained within the range of about 0.10 to 0.50. The second factor, ("Active Loading") should be maintained within the range of about 1.0 to 5.0. The third factor, (Volumetric Loading) should be maintained within the range of about 35 to 50.

Activated sludge systems which are operated within these permissible ranges of loading factors will provide a satisfactory purification treatment with a relatively high degree of certainty.

The permissible ranges indicated above in connection with the first two loading factors, namely, F/M Loading and Active Loading, generally obtain regardless of whether the activated sludge system is being utilized to treat domestic or industrial wastes. Both of these fac-tors relate to a ratio of the amount of the BOD existing in the waste and which must be removed therefrom in the purification process to the amount of autocatalytic material (Active Material) which is responsible for such removal.

The third factor, Volumetric Loading, is applicable only to activated sludge systems which are used to treat primarily domestic sewage. This factor relates to a ratio of the amount of BOD which is being loaded into an aeration tank with the physical size of the aeration tank. Volumetric Loading relates meaningfully to the amount of autocatalytic material in the aeration tank only when the concentration of BOD in the incoming waste is fairly constant. The concentration of BOD in waste which is primarily domestic sewage is fairly constant and thus Volumetric Loading can be used conveniently as a loading factor in respect of activated sludge processes which are treating primarily domestic sewage. The concentration of BOD in industrial wastes, however, is not constant and is subject to substantial variations. Consequently, Volumetric Loading is generally not employed in connection with activated sludge systems which are intended to treat primarily industrial wastes.

With respect to the above loading factors, it is noted that all relate to the pounds of BOD being introduced into the aeration tank of the activated sludge process and do not relate in any manner whatsoever to the amount of BOD which may have been previously removed, in the form of settleable solids, in the primary clarifier. It will be appreciated, however, that the greater the amount of total BOD which is removed in the primary clarifier, the lesser is the amount of the total BOD which must be removed in the aeration tank, to which the above loading factors relate.

Thus, it is apparent that an increased efficiency in the removal of BOD in the primary clarifier will have the effect of reducing not only the amount of BOD which must be removed in the aeration tank, but also, within obtainable limits, the physical size of the aeration tank.

As noted, a large portion of the total BOD must be removed in the aeration tank since the primary clarifier generally only removes the BOD which relates to the settleable solids in the raw sewage. With respect to domestic sewage, the BOD which is attributable to the settleable solids and which is removed in the primary clarifier is only about 30 percent of the total BOD of the raw sewage. Efforts have been made in the past to increase the efficiency of BOD removal in the primary clarifier, by adding to the raw sewage upstream of the primary clarifier, an additive for the enhancement of flocculation of colloidal suspended solids. Of course, if a substantial portion of the colloidal suspended solids can be settled out in the primary clarifier, the BOD loading atributable to the colloidal suspended solids need not be borne by the aeration tank.

Generally, the additives that have been added upstream of the primary clarifier to enhance flocculation and removal of colloidal suspended solids in the primary clarifier, have been chemicals which enable the individual colloidal suspended solid particles to form aggregates thereof of sufficient size to gravitationally separate from the remaining waste water in the primary clarifier. Chemicals which have been heretofore used for rendering the individual colloidal suspended solid particles susceptible of forming gravitationally settleable aggregates have included lime, hydrolyzing metal salts of aluminum and iron, and organic polyelectrolytes of a broad variety of compositions.

While such additives have enhanced the efficiency of BOD removal in the primary clarifier, thus reducing the BOD loading on the aeration tank, they have introduced certain problems of a practical nature in the efficient operation of an activated sludge sewage treatment system.

First of all, such additives are not inexpensive and therefore increase the operating costs of a sewage treatment system in which they are employed. Secondly, they introduce a handling problem, particularly in the case of inorganic salts. The additive must be delivered to the waste treatment plant by some mode of conveyance and oftentimes requires a storage capability at the plant site. Other handling problems involve the preparation of suitable solutions for introduction into the raw sewage, the necessity for providing a substantially uniform mixing of the additive with the raw sewage and the prevention of the hazardous condi-tions that may result from spills.

In addition, chemical additives increase the problems and difficulties in disposing of the waste sludge. Inorganic salts, for example, produce a relatively watery sludge which increases the total amount of waste sludge which must be removed from the system. Furthermore, sludge which contains inorganic salts is generally not self-combustible and, therefore, if an incineration disposal system is used, an external fuel must be added. While organic polyelectrolytes can generally be removed and disposed of in conventional manners, the chemical itself is not recoverable.

Thus, while the addition of chemical additives has been used heretofore for increasing BOD removal in the primary clarifier, the expenses and handling problems attendant thereto have been limiting considerations in more widespread use.

My invention resides in the discovery that the component of activated sludge referred to hereinabove as Active Material can be advantageously utilized as a flocculation agent for enhancing flocculation of colloidal suspended solids in the primary clarifier, and further, that such Active Material not only provides a degree of flocculation at least as great as that which is afforded by previously used chemical additives, but can be produced and developed within the waste treatment system itself, i.e., produced in situ, thereby providing all of the advantages attributable to known chemical additives while eliminating all of the disadvantages attendant thereto.

It is known that among the microorganisms which exist in the Active Material component of activated sludge are those capable of biochemically generating polymeric material. The various types of microorganisms in Active Material and the order of dominance thereof may vary not only from one activated sludge system to another, but may also vary in time within a single system, depending upon various internal and external conditions relating to activated sludge systems discussed hereinabove.

However, it is unimportant in the practice of the present invention that the specific makeup of the microorganisms in the Active Material be ascertained or even easily ascertainable, since conditions can be provided, in accordance with the principles of my invention, by which those microorganisms capable of generating polymeric material can be systematically separated from those which either do not generate such material or do not generate it in any substantial quantity.

Therefore, in accordance with the principles of the present invention, Active Material is subjected to an environment which separates the biopolymer generators (those microorganisms which generate polymeric material) from the other components of Active Material, and enhances the generation of polymeric material by the polymer generators. The polymeric material thus generated is used within the same sewage treatment system in which it is generated to serve as a flocculation agent in enhancing the removal of flocculative material in the primary clarifier, the effect of which is to so increase the percentage of BOD removed in the primary clarifier as to enable an aeration tank sized to remove a predetermined BOD in a known system, to accommodate a hydraulic loading, that is, a rate of flow of waste water therethrough, which is approxi-mately twice that of which known systems are capable.

One microorganism that is generally presumed to exist in the Active Material of all activated sludge waste treatment systems is *Zoogloea ramigera*. This microorganism has long been commonly referred to as a "slime producer". "Slime" has been used for decades to describe the physical characteristics of the material found on the rocks of early waste treatment systems known as trickling filters.

I have discovered that this "slime", which is actually poly-meric material generated by certain microorganisms, such as *Zoogloea ramigera* and others known in the art (see, for example, Anderson R., McCoy, E., *Bacteriology Proceedings*, p. 162 (1963) and Wallen, L., Davis, E., *Environmental Science and Technology*, Volume 6, Number 2, p. 161–4, February, 1972, and others) can be self-generated in a sewage treatment system in quantities and with characteristics sufficient to enable it to be used as an effective flocculation agent in the flocculation of the colloidal suspended solids found in domestic raw sewage. The generation of the polymeric material requires a selection process and the provision of an environment in which the biopolymer generators are subjected to conditions which enhance the generation of the biopolymeric material, all of which is included in various facets of the present invention.

Specifically, I have discovered that the microorganisms in Active Material which are capable of generating biopolymers can be separated from the non-polymer generators and caused to generate substantial quantities of polymeric material by a succession of steps which include, first of all, subjecting the Active Material to a high food content environment, then to a flocculation and separation process. In the high food content environment the microorganisms in the Active Material assimilate BOD (the food component of the sewage), thereby regenerating their polymer generation capabilities.

In the flocculation and separation process the individual polymer generators are physically joined to form aggregates which can be relatively easily separated from the waste water and the non-aggregated dispersed non-polymer generator microorganisms. This separation of the polymer generators from those microorganisms which do not generate polymeric material occurs in an environment in which all of the microorganisms are subjected to a field of velocity gradient, as a consequence of which the microorganisms are caused to collide with one another. As is well known, the polymer generators have an affinity for one another (a high aggregation/collision ratio) and form floccules which readily settle when subjected to a state of relative quiescence. The non-polymer generators, however, do not form floccules either with one another or with the polymer generators, and as a result do not settle in the manner of the floccules of polymer generators The separated floccules of polymer generators may be conveniently referred to as a low polymer ratio flocculation agent. This term describes the relative amount of polymeric material vis-a-vis the total amount of the Active Material (on a dry weight basis) which has been separated from the waste water and the non-polymer generators.

Thus, after the Active Material has been subjected to the high food content environment, and after the polymer generators have been separated from the non-polymer generators, the amount of polymeric material contained in the Active Material, which includes the polymer generators separated from the waste water, is substantial. As noted hereinafter, however, the ratio of polymeric material to the total Active Material can be increased and, in addition, the flocculation characteristics of the polymeric material can be substantially improved.

In accordance with the present invention, the low polymer ratio flocculation agent may be subjected to subsequent process steps in which the amount of polymeric material and the flocculent characteristics thereof are increased and improved. Specifically, the low polymer ratio flocculation agent is subjected to a low food content environment, as a consequence of which intracellular material which has been assimilated and synthesized by the polymer generators is converted into extracellular polymeric material. Thus the ratio of polymeric material to Active Material increases. The resultant Active Material may be conveniently referred to as a high polymer ratio flocculation agent, the flocculation properties of which are substantially greater than those of the low polymer ratio flocculation agent.

The conversion of intracellular material can be enhanced by subjecting the Active Material to an agitated condition while it is subjected to the low food content environment. Preferably, the agitation is produced by the introduction of air into the zone in which the low food content environment is maintained. In my opinion, conversion is enhanced by agitation by reducing the propensity of the floccules to settle out and, at least as importantly, by physically shearing extracellular polymeric material from the polymer generators.

By producing the agitated condition by means of air streams, oxygen is transferred to the low food content environment, which may enhance the rate of conversion to extracellular polymeric material as well as improve the flocculation characteristics of the polymeric material.

Actually, the high polymer ratio flocculation agent can be subjected to a succession of similar processes in which the flocculation agent derived from the preceding process is subjected to a low food content environment and then to subsequent flocculation and separation stages. In this manner the ratio of polymeric material and the flocculation characteristics thereof can be increased.

A portion of the high polymer ratio flocculation agent withdrawn from the final separator is introduced into the raw sewage upstream of the primary clarifier. Another portion is recycled and again subjected to the high food content environment for continuous operation of the sewage treatment process.

That portion of the high polymer ratio flocculation agent which is introduced into the raw sewage is preferably mixed with the sewage upstream of a flocculation stage to which the admixture is delivered. The intensity of mixing of high polymer ratio flocculation agent and raw sewage bears a relation to the efficiency with which the colloidal suspended solids can be flocculated. In my opinion, mixing rates in excess of 50 sec.$^{-1}$, if maintained for periods of more than one-half sec., provide adequate dispersion of the flocculation agent in the raw sewage stream to assure an acceptable flocculation efficiency.

The foregoing description of my invention can be better understood by making reference to the flow diagram shown in FIG. 7 in which reference numeral 10 indicates generally a waste treatment process which embodies the principles of my invention.

Reference numeral 11 indicates a stream of raw domestic sewage which is to be treated by the process 10. The sewage is introduced initially into a mixing vessel indicated at 12 into which a supply of high polymer ratio flocculation agent is delivered through a conduit 13.

The raw sewage and high polymer ratio flocculation agent are preferably intimately mixed in the vessel 12, which has been denominated on the drawing as a biopolymer initial mixing stage. As noted, the intensity of mixing bears some relation to the flocculation capabilities of the high polymer ratio flocculation agent and the highest feasible mixing intensity is preferred.

The admixture of raw sewage and high polymer ratio flocculation agent is then delivered through a conduit 14 to a flocculation stage indicated at reference numeral 16. The flocculation stage 16 may comprise a conventional flocculator, as will be understood by those skilled in the art. Preferably, the velocity gradient in the flocculation stage does not exceed approximately 30 sec.$^{-1}$ and is maintained for a time period of approximately 30 minutes. These parameters may vary, however, due to variations in the constituents of the raw sewage, the concentration of the high polymer ratio flocculation agent, and the like, as will be understood by those skilled in the art.

From the flocculation stage 16 the flocculated raw sewage, including aggregated colloidal suspended solids, is delivered to a primary clarifier 18 through a conduit 17. The primary clarifier, of course, provides a zone of relative quiescence in which the gravitationally settleable solids descend to the bottom of the clarifier 18.

In known systems, for example those illustrated in FIGS. 1–5, only the gravitationally settleable solids and the BOD attendant thereto is removed in the primary clarifier. As a consequence of the introduction of the high polymer ratio flocculation agent into the raw sewage, however, the clarifier 18 of the present invention removes not only the gravitationally settleable solids present in the raw sewage but also the aggregated colloidal suspended solids and the BOD corresponding thereto.

The supernatant from the primary clarifier 18 is transported through a conduit 19 to a stage identified in FIG. 7 at reference numeral 20 as a mixing-aeration stage. The supernatant delivered to the mixing-aeration stage 20 is substantially devoid of all suspended solids which previously existed in the raw sewage. Thus the supernatant withdrawn from the primary clarifier of the present invention has a BOD content which is much less than the superantant withdrawn from the primary clarifiers of known systems unless, of course, as noted hereinabove, chemical additives or the like are added to the sewage upstream of the primary clarifier for the purpose of enhancing flocculation.

Also supplied to the mixing-aeration stage 20 through a conduit 21 is a quantity of high polymer ratio flocculation agent. This flocculation agent is derived from the same source as the high polymer ratio flocculation agent entering the initial mixing stage 12 through the conduit 13.

Even though the supernatant introduced into the mixing-aeration stage 20 has a substantial amount of BOD removed, there still remains a portion of the BOD corresponding to the soluble solids in the raw sewage which has not yet been removed. As a result of the existence of this BOD in the supernatant entering the mixing-aeration stage, this stage also corresponds to the high food content environment mentioned hereinabove.

With respect to acceptable ratios of the amount of BOD loaded in the mixing-aeration stage 20 to the amount of high polymer ratio flocculation agent (Active Material), reference may be made to the acceptable levels of loading of known systems mentioned hereinabove. Thus, the preferred range of Active Loading in the mixing-aeration stage 20 (that is, the pounds of BOD loaded per day per pound of Active Material in the mixing-aeration stage 20) is preferably in the order of about 1.0 to 5.0.

The microorganisms in the high polymer ratio flocculation agent (Active Material) introduced into the mixing-aeration stage 20 through the conduit 21 assimilate, oxidize and synthesize the BOD contained in the soluble solids of the supernatant. The detention time of the mixing-aeration stage 20 is determined as a consequence of the magnitude of the Active Loading factor employed.

After the appropriate detention time in the mixing-aeration stage 20, the assimilation of the BOD by the Active Material reduces the ratio of the quantity of polymeric material to the total quantity of the Active Material in which it is contained and of which it is a constituent. Consequently, the Active Material after it is withdrawn from the mixing-aeration stage 20, may be conveniently referred to as a low polymer ratio flocculation agent.

This low polymer ratio flocculation agent and the supernatant withdrawn from the mixing-aeration stage 20 is conducted through a conduit 22 to a flocculation stage indicated at 23. The velocity gradient and detention time relating to the flocculation stage 22 is preferably within the same ranges as those discussed hereinabove in connection with the flocculation stage 16.

In the flocculation stage 23 the dispersed particles of low polymer ratio flocculation agent collide with one another and, due to the mutual affinity thereof, form aggregated floccules. These, of course, are more settleable than the dispersed non-polymer generators which may be present in the supernatant.

From the flocculation stage 23 the admixture is delivered through a conduit 24 to a thickener-separator stage indicated at reference numeral 26. In this stage the aggregated floccules of the low polymer ratio flocculation agent are gravitationally separated. Preferably, the thickener-separator 26 is operated at an overflow rate, not exceeding approximately 1500 gallons per day per square foot of surface area.

Supernatant is withdrawn from the thickener-separator stage 26 through a conduit 27 and conducted to a disinfection stage 28 where preferably chlorine or the like is introduced into the supernatant. The chlorinated supernatant is then conducted through a conduit 29 to a flocculation stage 30, from which is is transported through a conduit 31 to a final clarifier indicated at reference numeral 32.

In clarifier 32 the gravitationally separable solids still remaining are settled out, and the supernatant withdrawn therefrom, which may now be conveniently referred to as "final effluent", is withdrawn through a conduit 32a.

The settled-out solids in the final clarifier 32, being inactive due to the disinfection thereof, can be indefinitely stored in the base of the final clarifier 32 until such time as disposal is convenient. It may also be desirable to recirculate a portion of the settled solids through a conduit 33 to the flocculation stage 30, thereby increasing the floc volume fraction in the flocculation stage 30. As is recognized, this increase in floc volume fraction will enhance the removal of suspended solids entering the flocculation stage 30 with the disinfected supernatant.

The remaining portion of the settled solids are denominated in FIG. 7 as "final flocculated waste material" and may be conducted through a conduit 34 to a suitable disposal process or treatment zone.

Referring again to the thickener-separator stage 26, the settled low polymer ratio flocculation agent is withdrawn from the lower end thereof and conducted through a conduit 36 into a mixing-aeration stage or tank 37. It is noted that the mixing-aeration stage 37 differs from mixing-aeration stage 20 in that it is not supplied with supernatant containing BOD. Thus, the food content for the Active Material (active biological material) or low polymer ratio flocculation agent is substantially less than that contained in the mixing-aeration stage 20, as a consequence of which the mixing-aeration stage 37 may be referred to as a low food content environment.

The low polymer ratio flocculation agent delivered to the mixing-aeration stage 37 may be agitated by air streams in a manner similar to that discussed above in connection with the mixing-aeration stage 20. Since the mixing-aeration stage 37 is substantially devoid of food content, a portion of the intracellular material of the polymer generators is converted to extra-cellular polymeric material. A detention time in the mixing-aeration stage 37 of about one to five hours in a BOD environment of less than 20 milligrams per liter with an Active Material concentration greater than 500 milligrams per liter will provide for adequate conversion of the intracellular to extracellular material. After this conversion, the Active Material in the mixing-aeration stage 37 may be referred to as "intermediate polymer ratio flocculation agent" since the ratio of the amount of polymeric material to the total amount of Active Material has increased.

From the mixing-aeration stage 37 the intermediate polymer ratio flocculation agent and the water in which it is suspended is conducted through a conduit 38 to a flocculation stage 39. The velocity gradient and detention time employed in the flocculation stage 39 is preferably similar to those employed in the flocculation stage 23. The admixture is then conducted through a conduit 40 to a thickener-separator, indicated at reference numeral 41. Preferably, this stage is operated at an overflow rate which does not exceed 1000 gallons per day per square foot of surface area.

Supernatant is withdrawn through a conduit 42, which connects with a conduit 43 in conducting the thickener supernatant to the conduit 27, from whence it flows through the conduit 27, along with the supernatant from the thickener-separator stage 26, to the disinfection stage 28. The settled intermediate polymer ratio flocculation agent, on the other hand, is withdrawn from the bottom of the thickener-separator stage 41 and conducted through a conduit 44 to a mixing-aeration stage, indicated at numeral 46. Mixing-aeration stage 46, similarly to stage 37, may be referred to as a low food content environment since it is not charged or supplied with any BOD-containing supernatant. Consequently, additional intracellular material of the polymer generators is converted to extracellular polymeric material and the ratio of the amount of polymeric material to the total amount of the Active Material is once again increased. This Active Material is referred to as high polymer ratio flocculation agent.

The admixture of high polymer ratio flocculation agent and the water in which it is suspended is then conducted through a conduit 47 to a subsequent flocculation stage 48 and thence through a conduit 49 to a thickener-separator stage 50. The flocculation stage 48 is preferably operated at the velocity gradient and detention time utilized in connection with the flocculation stage 39. The thickener-separator stage 50 is preferably operated at an overflow rate not exceeding 500 gallons per day per square foot of surface area.

Supernatant is withdrawn from the thickener-separator stage 50 through a conduit 51 which connects with the previously described conduit 43. The settled high polymer ratio flocculation agent or Active Material, on the other hand, is withdrawn from the bottom of the thickener-separator 50 for subsequent utilization as a flocculation agent.

It will be appreciated that the mixing-aeration stage 37, the flocculation stage 39 and the thickener-separator stage 40, which are indicated in FIG. 7 as comprising a "1st stage generation" and the subsequent "2nd stage generation" comprising the mixing-aeration stage 46, the flocculation stage 48 and the thickener-separator stage 50 may be followed by further generation stages, since each subsequent generation stage will increase the ratio of the amount of polymeric material to active material to a point at which the polymer generating microorganisms are inactivated due to excessive endogenous respiration. Preferably, the high polymer ratio flocculation agent comprises a practical minimum of about 10 percent to a practical maximum of about 40 percent by dry weight of biologically derived polymeric material. On the other hand, it may not be necessary or practical to increase the polymeric ratio of the flocculation agent to the maximum condition and in the embodiment of the invention disclosed herein, only two generation stages are included. Of course, depending upon the ratio being desired in connection with any given sewage treatment system, a single generation stage may be adequate.

It is noted that the concentration of Active Material is increased in each subsequent generation stage. Thus, in each stage the quantity of water in which the Active Material is suspended is reduced. This increase in Active Material concentration can have beneficial effects on the rate of conversion of the intracellular material to extracellular polymeric material.

Since the Active Material (or at least a portion thereof) is ultimately utilized as a flocculation agent, the flocculation characteristics thereof should be enhanced to the degree feasible. It has been determined that the flocculation characteristics of the Active Material are enhanced when it is subjected to aeration, and thus it is preferable in many instances to subject the flocculation agent to at least two stages of generation. A conven-ient means of determining the flocculation characteristic of the Active Material is the conventional Jar Test.

A portion of the high polymer ratio flocculation agent withdrawn from the thickener-separator 50 is introduced to the mixing-aeration stage 20 where it is subjected to a high food content environment. In stage 20, of course, the flocculation agent or Active Material assimilates, oxidizes and synthesizes the BOD contained in the supernatant entering through the conduit 20 and the cycle is repeated.

The remaining portion of the high polymer ratio flocculation agent withdrawn from the thickener-separator 50 is conducted through a conduit 52 which connects with the conduit 13 to deliver the high polymer ratio flocculation agent to the initial mixing stage 12. Consequently, it may be observed that the flocculation agent which is introduced into the raw sewage and which is responsible for the vastly increased removal of BOD in the primary clarifier 18 is produced within the waste treatment system 10, i.e., produced in situ. The solids which settle in the primary clarifier 18 are withdrawn through a conduit 53 to mix with the waste material being removed from the final clarifier 32 through the conduit 34 and disposed of in any suitable manner.

In order to appreciate some of the many advantages of a sewage treatment system operated in accordance with the principles of the present invention, as contrasted with known sewage treatment systems, reference is made to the chart shown in FIG. 6. The chart is aptly entitled "Aeration Tank Capacities and Permissible Loadings" and in the left-hand column thereof are indicated the five known sewage treatment systems illustrated in FIGS. 1–5 as well as a system operated in accordance with the principles of the present invention.

As noted, the F/M Loading factors indicated for the five systems illustrated in FIGS. 1–5 are within the previously discussed ranges of 0.10 to 0.50. Since the F/M Loading factor is only applicable to a system in which activated sludge is utilized, this factor is not applicable to the present invention and none is indicated.

With respect to the column entitled "Active Loading", the factors indicated therein for the known systems fall within the range previously discussed, that is, between 1.0 and 5.0. An Active Loading factor is applicable to the present invention and, as indicated, is in the magnitude of about 5.0.

One of the improved operating characteristics of the present invention is indicated in the column entitled "Volumetric" which indicates the loading factor of a sewage treatment system relating to the pounds of BOD loaded per day per thousand cubic feet of aeration tank volume. As indicated, known systems employ a Volumetric Loading factor within the range of about 35 to 50. The Volumetric Loading factor of the present invention, however, is approximately 400, which indicates that an aeration tank having a given physical volume can accommodate approximately ten times the BOD loading of known waste treatment systems. Conversely, a sewage treatment system operated in accordance with the present invention will require an aeration tank having a volume which is essentially only about 10 percent as great as the aeration tank volume required in known sewage treatment processes.

The column entitled "Normal Hydraulic Loads" indicates another significant aspect of the present invention. This column indicates, essentially, the pounds of BOD which are contained in a million gallons of water which, in a sewage treatment process, is introduced to the aeration tank. As a consequence of the removal of the colloidal suspended solids in the primary clarifier 18 of the present invention, the contents of the supernatant which enters the aeration tank 20 is substantially less than that which is contained in the supernatant which enters the aeration tank of known sewage treatment systems which do not utilize chemical additives.

For example, the normal hydraulic loads for the waste treatment systems indicated in FIGS. 1–5, are within the range of between 1500 and 2150. The normal hydraulic load of the present invention is only approximately 650, however.

The right-hand column in FIG. 6 entitled "Required Aeration Volumes" indicates the favorable manner in which the design criteria of the present invention compares with that of known sewage treatment systems. This column indicates the number of cubic feet of aeration tank volume required per million gallons of raw sewage treated per day.

As noted, the known systems require an aeration volume which ranges from between approximately 30,000 and 62,000 cubic feet of aeration tank volume per million gallons of raw sewage treated per day. On the other hand, the aeration tank 20 of the present invention requires only approximately 2,000 cubic feet per million gallons of raw sewage treated per day, or approximately only 5 percent of the total volume required in the aeration stage of known systems.

It will be apparent from the foregoing that a sewage treatment plant constructed and operated in accordance with the principles of the present invention accommodates a sewage capacity much greater than the capacity of any of the known systems shown in FIGS. 1–5 of equivalent physical size. Further, a sewage treatment plant constructed in accordance with the present invention which is of approximately the same physical size as any of the known systems shown in FIGS. 1–5 has a sewage loading capacity which is equal to the capacity which any of such known systems would have if chemical additives were added to the raw sewage stream upstream of the primary clarifier in order to enhance flocculation and BOD removal in the primary clarifier. This additional capacity is obtained, however, without incurring any of the disadvantages hereinabove mentioned in connection with systems which utilize chemical additives as flocculation agents.

Consequently, for a predetermined capacity a sewage treatment plant constructed in accordance with the present invention will be substantially less expensive, so far as initial cost is concerned, than a sewage treatment plant which corresponds to any of the known systems. On the other hand, operating costs for the system constructed according to the invention will be no greater than any of the known systems of comparable physical size even through the capacity is approximately twice as great as the treatment capacity of any of the known sewage treatment systems of comparable size.

In addition, the principles of the present invention can be utilized in modifying any existing sewage treatment plants constructed in accordance with presently known design criteria to substantially double the treatment capacity of the system without increasing the operating costs in any measurable degree.

FIG. 8 illustrates diagrammatically a conventional activated sludge plant which corresponds generally to the system shown in FIG. 1.

In FIG. 8, raw sewage is supplied to a primary clarifier 57 through a conduit 58, from which primary supernatant is conducted through a conduit 59 to an aeration tank indicated at reference numeral 60. Mixed Liquor is withdrawn from the aeration tank 60 as at 61 and introduced into a final clarifier 62 from which supernatant is withdrawn at 63 and subjected to disinfection at 64. The final effluent is discharged through a conduit 66.

In the primary clarifier 57 only the settleable solids are separated from the raw sewage. Thus, a substantial portion of the BOD present in the raw sewage is introduced into the aeration tank 60 in the primary supernatant.

As noted, a portion of the final activated sludge withdrawn from the final clarifier 62 is disposed of along with primary sludge from the initial clarifier 57. A portion of the activated sludge from the final clarifier 62 is recycled into the aeration tank 60 for removal of the BOD associated with the soluble solids and the colloidal suspended solids.

FIG. 9 is illustrative of the conventional activated sludge plant illustrated in FIG. 8, modified to accommodate an improved sewage treatment system according to the principles of the present invention. The aeration tank has been effectively partitioned into three operating zones. Each zone includes a mixing-aeration stage, a flocculation stage and a thickener-separator stage corresponding to the similarly denominated stages shown in the block diagram of FIG. 7. The high polymer ratio flocculation agent which is withdrawn from the 2nd stage generation is mixed with the raw sewage upstream of a flocculation stage which is interposed ahead of the primary clarifier 57a.

The primary and final clarifiers 57a and 62a are utilized in the improved sewage treatment plant in substantially the same manner as they were utilized in the conventional plant shown in FIG. 8. The primary clarifier 57a, however, effectively removes a much greater percentage of the BOD contained in the raw sewage as a consequence of the action of the flocculation agent, that is, the Active Material self-generated and produced in the 1st stage and 2nd stage generation zones.

There is, of course, certain costs involved in converting from the conventional plant shown in FIG. 8 to the modified and improved plant shown in FIG. 9. For example, the bio-polymer initial mixing stage shown in FIG. 9 must be added to the system. In addition, the aeration tank must be partitioned and altered to accommodate the flocculation and thickener-separation stages in each of the three zones. Flocculation stages should also be added ahead of each of the two clarifiers.

On the other hand, the modified system illustrated in FIG. 9 will be capable of treating approximately twice the amount of raw sewage of which the system shown in FIG. 8 is capable of treating. The operating costs between the two systems are about the same regardless of the doubled capacity of the improved system. As a consequence, the first cost of converting from a conventional system to an improved system constructed in accordance with the principles of the present invention are more than justified by the added treatment capacity of the modified system.

Although minor modifications might be suggested by those versed in the art, it should be understood that I wish to embody within the scope of the patent warranted hereon all such modifications as reasonably come within the scope of my contribution to the art.

What I claim is:

1. A method of treating sewage in a sewage treatment plant comprising the steps of introducing a first quantity of high polymer ratio flocculation agent, comprising polymeric material and microorganisms from which said polymer-ic material is derived, into a quantity of raw sewage, to produce an admixture thereof,
    said high polymer ratio flocculation agent comprising at least
    10 percent by dry weight biologically derived polymeric material, subjecting the admixture to a state of relative quiescence to settle out polymer flocculated colloidal suspended solids from supernatant,
    separating the supernatant from said settled solids,
    introducing a second quantity of said high polymer ratio flocculation agent to said supernatant,
    subjecting the admixture of said supernatant and said second quantity of high polymer ratio flocculation agent to aeration to produce an admixture of low polymer ratio flocculation agent and aerated supernatant,
    concentrating said low polymer ratio flocculation agent and separating the aerated supernatant therefrom,
    subjecting said concentrated low polymer ratio flocculation agent to conditions which increase the mass ratio of said polymeric material to said microorganisms to produce said high polymer ratio flocculation agent, and dividing said high polymer ratio flocculation agent into first and second quantities which comprise respectively said first and second quantities introduced into said raw sewage and to said supernatant.

2. The method as defined in claim 1 wherein said raw sewage has an ascertainable BOD content, wherein said supernatant separated from said settled solids has a BOD content less than that of said raw sewage, and wherein said conditions which increase the mass ratio of said polymeric material to said microorganisms to produce said high polymer ratio flocculation agent involve an environment having a BOD content less than that of said supernatant.

3. The method as defined in claim 1, wherein said high polymer ratio flocculation agent comprises about 10–40 percent by dry weight biologically derived polymeric material.

4. The method as defined in claim 2, wherein said conditions which increase the mass ratio of said polymeric material to said microorganisms includes the step of agitating said concentrated low polymer ratio flocculation agent in said low BOD environment.

5. A method of treating sewage comprising the steps of delivering a quantity of raw sewage to a primary clarifier to remove BOD attributable to suspended solids,
    withdrawing supernatant containing BOD attributable to soluble solids from said primary clarifier and introducing same to an aeration tank,
    supplying said aeration tank with a mass of microorganisms capable of generating polymeric material,
    supplying oxygen to said aeration tank,
    withdrawing said supernatant and said microorganisms from said aeration tank and subjecting same to flocculation and separation to remove supernatant from said microorganisms,
    transporting said microorganisms to an environmental zone devoid of additional BOD loading and maintaining same in said environmental zone for a length of time sufficient to biochemically generate by virtue of the extracellular activities of said microorganisms a mass of polymeric material which constitutes at least 10 percent of the total mass of polymeric material and microorganisms on a dry weight basis, and
    transporting said polymeric material to said raw sewage to mix therewith before said sewage is delivered to said primary clarifier for enhancing flocculation and separation of colloidal suspended solids in said primary clarifier.

6. A method of treating sewage comprising the steps of supplying raw sewage to a primary clarifier,
    removing supernatant from said primary clarifier to an aeration tank,
    adding oxygen and a quantity of microorganisms, at least some of which are capable of generating polymeric material to said aeration tank,
    transporting said supernatant and said microorganisms contained therein through a flocculation and separation stage and separating those microorganisms which generate polymeric material from those which do not,
    subjecting said polymer generating microorganisms to an environmental condition devoid of readily assimilatable BOD to convert intracellular material of said polymer generating microorganisms to extracellular polymeric material without inactivating all of said polymer generating microorganisms,
    supplying a portion of said polymer generating microorganisms which are still active to said aeration tank for recycling purposes, and supplying at least a portion of said polymeric material to said raw sewage to mix therewith ahead of said primary clarifier for assisting in and enhancing the removal of settleable solids as well as colloidal suspended solids in said primary clarifier.

7. A method of treating sewage comprising
introducing a stream of raw sewage into a clarifier tank,
withdrawing supernatant from the clarifier tank and delivering same to an aeration tank,
introducing oxygen and microorganisms into said aeration tank, at least a portion of said microorganisms being capable of generating polymeric material,
withdrawing the admixture of said supernatant and microorganisms from said aeration tank,
separating polymer generating microorganisms from said admixture and subjecting same to a relatively high starvation environment to enhance the generation of polymeric material,
recycling at least a portion of said microorganisms back to said aeration tank, and
conducting at least a portion of said polymeric material to said stream of raw sewage upstream of said clarifier tank.

* * * * *